United States Patent [19]

Teramachi

[11] Patent Number: 4,478,462
[45] Date of Patent: Oct. 23, 1984

[54] LINEAR BALL BEARING UNIT

[76] Inventor: Hiroshi Teramachi, 2-34-8, Higashi-Tamagawa, Setagaya-Ku, Tokyo, Japan

[21] Appl. No.: 494,880

[22] Filed: May 16, 1983

[30] Foreign Application Priority Data

May 20, 1982 [JP] Japan .................................. 57-85436

[51] Int. Cl.$^3$ ............................................ F16C 29/06
[52] U.S. Cl. ................................................ 308/6 C
[58] Field of Search ...................... 308/6 C, 6 R, 6 A; 464/168

[56] References Cited

U.S. PATENT DOCUMENTS

| 4,302,059 | 11/1981 | Teramachi | 308/6 R |
| 4,363,526 | 12/1982 | Teramachi | 464/168 |
| 4,376,557 | 3/1983 | Teramachi | 308/6 C |
| 4,433,876 | 2/1984 | Mottate | 308/6 C |

Primary Examiner—Lenard A. Footland
Attorney, Agent, or Firm—Peter L. Berger

[57] ABSTRACT

A linear ball bearing unit for use in machine tools, transportation robots or the like. The bearing unit comprises a bearing body having a pair of skirts provided on their opposing surfaces with longitudinal ribs, the bearing body further having ball rolling grooves formed in both side surfaces of the ribs and constituting parts of passageways for loaded balls, longitudinal recesses formed in the outer surfaces of the skirts, and channel members fitted in respective recesses, the recesses and channel members in combination constituting passageways for non-loaded balls. The bearing unit further comprises a track shaft provided in both side surfaces thereof with recesses for receiving the ribs on the bearing body, the recesses being provided in both side walls thereof with ball rolling grooves constituting parts of the passageways for loaded balls. Lids are attached to both ends of the bearing body and adapted to provide ball turn grooves through which the passageways for loaded balls are connected to corresponding passageways for non-loaded balls thereby to permit ball trains to be recirculated through the passageways for loaded ball and then through the passageways for the non-loaded balls.

7 Claims, 16 Drawing Figures

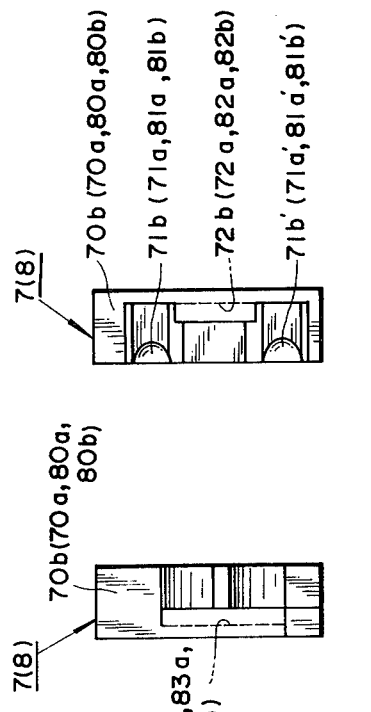
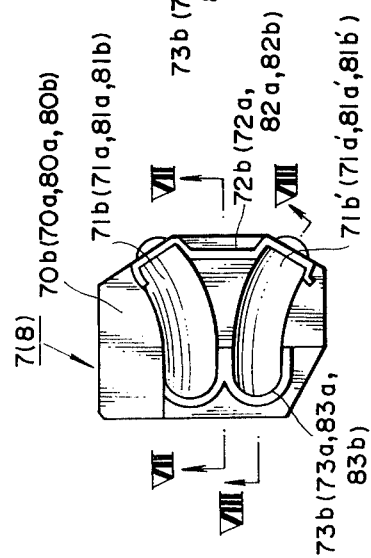

LINEAR BALL BEARING UNIT

BACKGROUND OF THE INVENTION

1. Field of the Invention

The present invention relates to a linear ball bearing unit suitable for use as a slide bearing unit in, for example, machine tools, machining centers or the like, as well as in transportation robots having parts which make reciprocal sliding motion while carrying heavy load.

2. Description of the Prior Art

A typical known linear ball bearing unit has a bearing body which is mounted on an elongated track shaft for movement along the length of the track shaft through the medium of balls interposed therebetween and retained by a ball retainer. This known linear ball bearing unit, however, suffers from various problems as follows.

Firstly, a complicated work is required for boring return passage bores for trains of non-loaded balls in the solid portions of the bearing body, to raise the production cost uneconomically.

Secondly, the known linear ball bearing unit of the type mentioned above can bear only light load particularly in the horizontal and radial directions. This is attributable to the fact that the vertical loads acting in upward and downward directions and horizontal loads acting in the horizontal directions to the left and right, as well as radial loads acting in radial directions, are born only by trains of loaded balls arranged to run along the lower sides of lateral projections projected laterally from both lateral ends of the track shaft.

Thirdly, the height of the bearing body is increased undesirably due to the necessity of the space for loaded ball trains and non-loaded ball trains on and above the track shaft, which in turn increases the level of position of the load application point of the bearing body. The loaded ball trains on the track shaft elevates also the position of load application point of the track shaft. The elevation of the load application points of both of the track shaft and the bearing body serve to deteriorate the stability of the linear ball bearing unit.

For stabilizing the bearing unit, particularly when the level of load application point of the track shaft is high, it is necessary to lower the position of the load application point of the bearing body by decreasing the vertical thickness of the same. The reduction of thickness, however, is accompanied inevitably by a reduction in the rigidity of the bearing body itself, resulting in a smaller capacity for bearing loads particularly in the horizontal and radial directions.

SUMMARY OF THE INVENTION

Accordingly, it is an object of the invention to provide a linear ball bearing unit in which the passages for the returning non-loaded balls are formed by a simple machining other than boring or drilling to reduce the production cost.

It is another object of the invention to provide a linear ball bearing unit which can bear greater horizontal and radial loads than known linear ball bearing units.

It is still another object of the invention to provide a linear ball bearing unit in which the position of the load application point is lowered to increase the stability, without being accompanied by any substantial reduction in the rigidity.

To these ends, according to an aspect of the invention, there is provided a linear ball bearing unit comprising: a bearing body having a pair of skirts provided on their opposing surfaces with longitudinal ribs, the bearing body further having ball rolling grooves formed in both side surfaces of the ribs and constituting parts of passageways for loaded balls, longitudinal recesses formed in the outer surfaces of the skirts, and channel members fitted in respective recesses, the recesses and channel members in combination constituting passageways for non-loaded balls; a track shaft provided in both side surfaces thereof with recesses for receiving the ribs on the bearing body, the recesses being provided in both side walls thereof with ball rolling grooves constituting parts of the passageways for loaded balls; and lids attached to both ends of the bearing body and adapted to provide ball turn grooves through which the passageways for loaded balls are connected to corresponding passageways for non-loaded balls thereby to permit ball trains to be recirculated through the passageways for loaded ball and then through the passageways for the non-loaded balls.

These and other objects, features and advantages of the invention will become clear from the following description of the preferred embodiments taken in conjunction with the accompanying drawings.

BRIEF DESCRIPTION OF THE DRAWINGS

FIGS. 1 to 16 in combination show an embodiment of the linear ball bearing unit in accordance with the invention in which:

FIG. 1 is a front elevational view of a bearing body;

FIG. 2 is a front elevational view of a track shaft;

FIG. 3 is an illustration of the bearing body and the track shaft assembled together through the medium of balls interposed between ball rolling surfaces of the bearing body and the track shaft;

FIG. 4 is a rear elevational view of a segment of a side lid;

FIG. 5 is a left side elevational view of the segment shown in FIG. 4;

FIG. 6 is a right side elevational view of the segment shown in FIG. 4;

FIG. 7 is a cross-sectional view taken along the line VII—VII of FIG. 4;

FIG. 8 is a cross-sectional view taken along the line VIII—VIII of FIG. 4;

FIG. 9 is a front elevational view of a segment of a retainer;

FIG. 10 is a vertical sectional view taken along the line X—X of FIG. 9;

FIG. 11 is an end view of the retainer segment;

FIG. 12 is a side elevational view of the bearing body mounted on the track shaft;

FIG. 13 is a plan view of the bearing body mounted on the track shaft;

FIG. 14 is a vertical sectional view taken along the line XIV—XIV of FIG. 13;

FIG. 15 is a vertical sectional view taken along the line XV—XV of FIG. 14, showing the interior of the bearing body demounted from the track shaft; and FIG. 16 is a cross-sectional view taken along the line XVI—XVI of FIG. 14 illustrating the recirculation of the ball train.

DESCRIPTION OF THE PREFERRED EMBODIMENT

A preferred embodiment of the invention will be described hereinunder with reference to the accompanying drawings.

Figure 1:
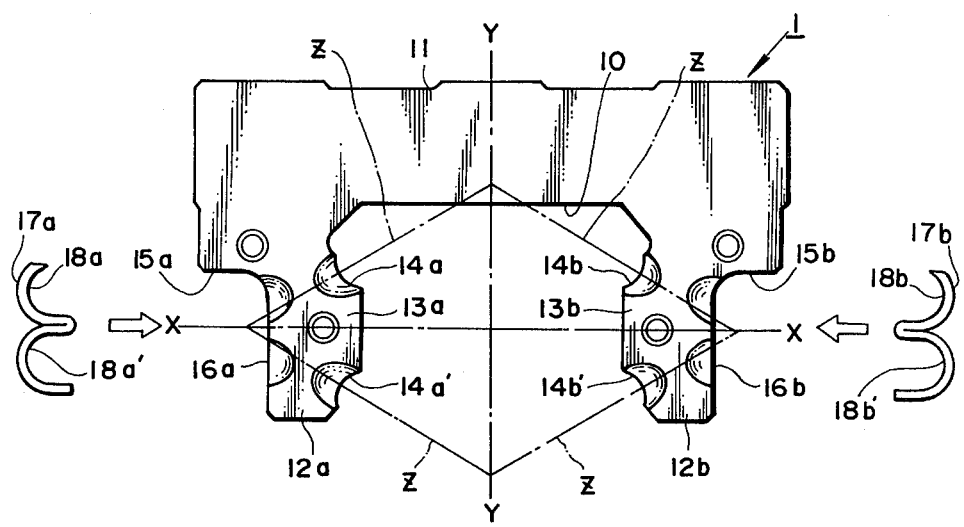

Referring first to FIG. 1, a bearing body generally designated at a numeral 1 is an elongated member having a substantially U-shaped cross-section defined by a top wall 11 and a pair of skirt portions 12a and 12b which are suspended from both side portions of the top wall 11 and defining therebetween a central recess 10 beneath the top wall 11. The skirts 12a and 12b are provided on their inner or opposing sides with longitudinal ribs each having a trapezoidal cross-section. The ribs 13a and 13b are provided in both side walls thereof with ball rolling grooves 14a, 14a' and 14b, 14b', each having a radius of curvature which is about a half of the diameter of the ball and extending over the entire length of the bearing body 1. Four ball rolling grooves 14a, 14a', 14b, 14b', constituting the passageways for the loaded balls B₁ are arranged in symmetry with respect to a horizontal axis X which connects the centers of both ribs 13a, 13b and with respect to a vertical axis Y which passes the center of the top wall 11. The centers of the arcs constituting the ball rolling grooves are located on respective sides Z of an imaginary diamond shape the sides Z of which intersect the horizontal and vertical axes X and Y at predetermined angles. Outer recesses 15a and 15b are formed in the outer sides of respective skirts 12a and 12b. Flat ball running surfaces 16a and 16b are formed on the bottoms of the outer recesses 15a and 15b. Longitudinal channel members 17a and 17b are adapted to fit in the outer recesses 15a and 15b, respectively. The channel member 17a is provided in its inner side with two curved ball rolling grooves 18a and 18a'. Similarly, the channel member 17b is provided with two ball rolling surfaces 18b and 18b'. As will be seen also from FIG. 3, the ball rolling surfaces 16a, 16a on the skirt 12a cooperate with the ball rolling grooves 18a, 18b in the channel member 17a in defining two rolling passageways 19a, 19a'. Similarly, two passageways 19b, 19b' for non-loaded balls are formed by the cooperation between the ball rolling surfaces 16b, 16b on the skirt 12b and the ball rolling grooves 18b, 18b' in the channel member 17b. These non-loaded ball passageways 19a, 19a',19b and 19b' are arranged in symmetry with respect to the horizontal axis X and the vertical axis Y mentioned before. More specifically, the non-loaded ball passageways 19a, 19a', 19b, 19b' are disposed in the close proximity of the horizontal axis X so that the height of the bearing body 1 is reduced considerably. This in turn lowers the position of the load application point of the bearing body to stabilize the bearing particularly against the loads applied in horizontal or radial directions. In order to ensure a smooth running of the non-loaded balls B₂, the non-loaded ball passageways 19a, 19a', 19b and 19b' are made to have a diameter somewhat greater than that of the balls.

Figure 2:
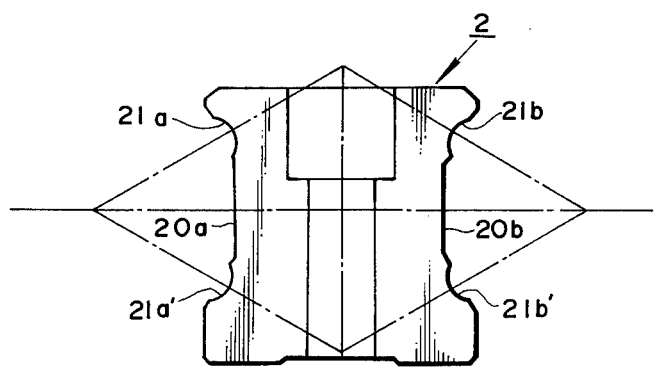
Figure 3:
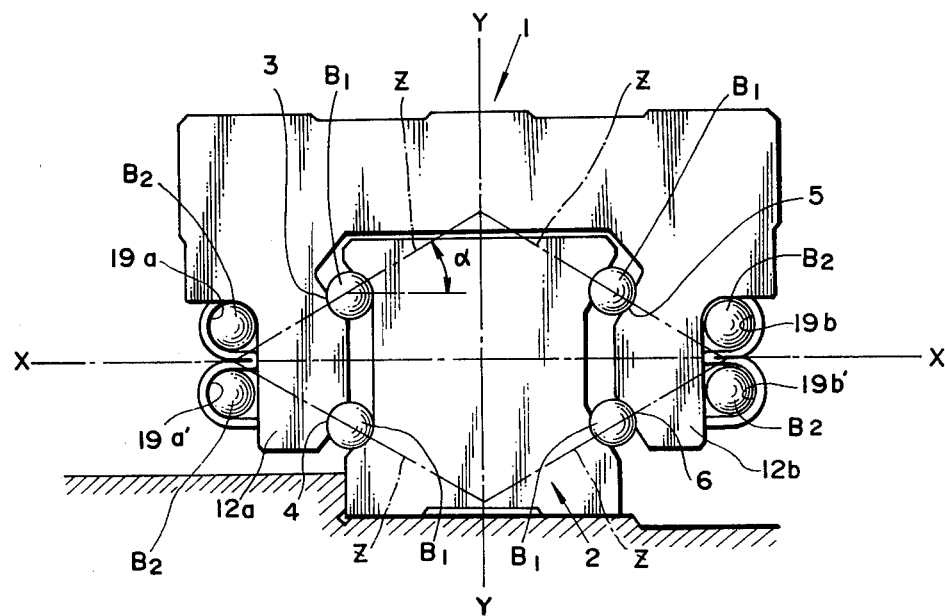

Referring now to FIG. 2, an elongated track shaft 2, which is adapted to be received by the central recess 10 of the bearing body 1, is fixed to a movable or stationary part of a machine tool or the like by means of a fixing means such as bolts. The track shaft 2 is provided in its both sides with recesses 20a and 20b for receiving the ribs 13a and 13b on the bearing body 1. The recess 20a is provided in its both vertical end portions with ball rolling grooves 21a and 21a' opposing to the ball rolling grooves 14a and 14a' formed in the bearing body 1. Similarly, ball rolling grooves 21b and 21b' formed in the vertical ends of the recess 20b correspond to the ball rolling grooves 14b and 14b' formed in the bearing body 1. The ball rolling surfaces 21a, 21a',21b and 21b' have a radius of curvature which is about a half of the diameter of the ball, and extend over the entire length of the track shaft 2. Thus, four loaded ball passageways 3 to 6 for loaded balls B₁ are formed by the cooperation between the ball rolling grooves 14a, 14a', 14b and 14b' in the bearing body 1 and the ball rolling grooves 21a, 21a', 21b and 21b' in the track shaft 2. Since the contact angle $\alpha$ between the loaded balls B₁ and the loaded ball passageways 3 to 6 is selected to be 45° as illustrated in FIG. 3, the bearing unit can uniformly bear both of the vertical and horizontal loads applied to the bearing body 1.

As stated before, the loaded ball passageways 3 to 6 are formed by ball rolling grooves 14a, 14a', 14b and 14b' formed in the bearing body 1 and the ball rolling grooves 21a, 21a', 21b and 21b' formed in the track shaft 2, each ball rolling grooves being a circular arc groove having a radius of curvature which is about a half of the ball diameter. Therefore, the loaded ball B₁ makes contact with the ball rolling grooves at two points spaced from each other in the direction of application of load, when the ball is preloaded or load is applied in various directions, so that the balls are allowed to roll smoothly without making any differential sliding or slip. When a heavy load is applied to the bearing body 1, each ball contacted by ball rolling grooves at two points makes an elastic deformation to provide substantial contact areas to increase the rigidity of the ball bearing. Furthermore, ideal arrangement employing a suitable contact angle $\alpha$ between the balls and four rows of circular grooves, in combination with the construction for two-point contact of the balls, can relieve elastic deformation of the balls, so that any offset of the ball rolling grooves which may incurred during assembling is conveniently absorbed within the bearing to ensure a smooth linear movement without encountering substantial resistance.

Numerous balls B in the form of continuous trains are circulated through each of the loaded ball passageways 3 to 6 defined by the ball rolling grooves 14a, 14a', 14b and 14b' in the bearing body 1 and the ball rolling grooves 21a, 21a', 21b and 21b' in the track shaft 2 and then through each of the non-loaded ball passageways 19a, 19a', 19b and 19b'. In each train of the balls B, the balls residing in the loaded region, i.e. the loaded ball passageway are referred to as "loaded balls B₁" while the balls in the non-loaded region, i.e. in the non-loaded passageway, are referred to as "non-loaded balls B₂". Thus, the balls B in respective trains are recirculated through the loaded ball passageways 3 to 6 and then through the non-loaded ball passageways 19a to 19b'.

FIGS. 4 to 8 in combination show segment type lids 7 and 8 adapted to be attached to the front and rear ends of the bearing body 1. These lids 7 and 8 are made by an injection molding or die-casting from a synthetic resin or a die-cast alloy. The construction of the lids 7 and 8 will be explained hereinunder with specific reference to the right-hand side segment 70b of the lid 7 by way of example. The right-side segment 70b of the lid 7 has U-shaped ball turn grooves 71b and 71b' having curved groove bottoms. These U-shaped ball turn grooves 71b and 71b' are connected at its inner ends to the loaded ball passageways 5 and 6, and at its outer ends to the non-loaded ball passageways 19b and 19b', respectively. The right-hand side segment 70b having the U-shaped ball turn grooves 71b, 71b' cooperate with a left-hand side segment 70a having similar construction and function in connecting the front ends of the loaded ball passageways 3 to 6 and the front ends of corresponding non-loaded ball passageways 19a to 19b' which in combination form continuous passageways for recirculation of the balls.

On the other hand, the loaded ball grooves 3 to 6 and the non-loaded ball grooves 19a to 19b are connected at their rear ends through another lid 8 composed of a pair of segments 80a and 80b having same construction and function as the segments of the first-mentioned lid 7. Thus, four indepedent ball recirculating passageways are formed by the combination of the loaded ball passageway 3 and the non-loaded ball passageway 19a, combination of the loaded ball passageway 4 and the non-loaded ball passageway 19a, combination of the loaded ball passageway 5 and the non-loaded ball passageway 19b, and the combination of the loaded ball passageway 6 and the non-loaded ball passageway 19b', respectively.

A retainer groove 72b is formed to have a predetermined depth in one 70b of the segments. This retainer groove 72b is intended for retaining a fixing a retainer 9 which will be mentioned later. The retainer groove 72b is formed across the inner ends of the U-shaped ball turn grooves 71b and 71b' mentioned before. Similar retainer grooves are formed also in the other 70a of the segments of the front lid 7, as well as in the pair of segments 80a and 80b of the rear lid 8.

Figure 12:
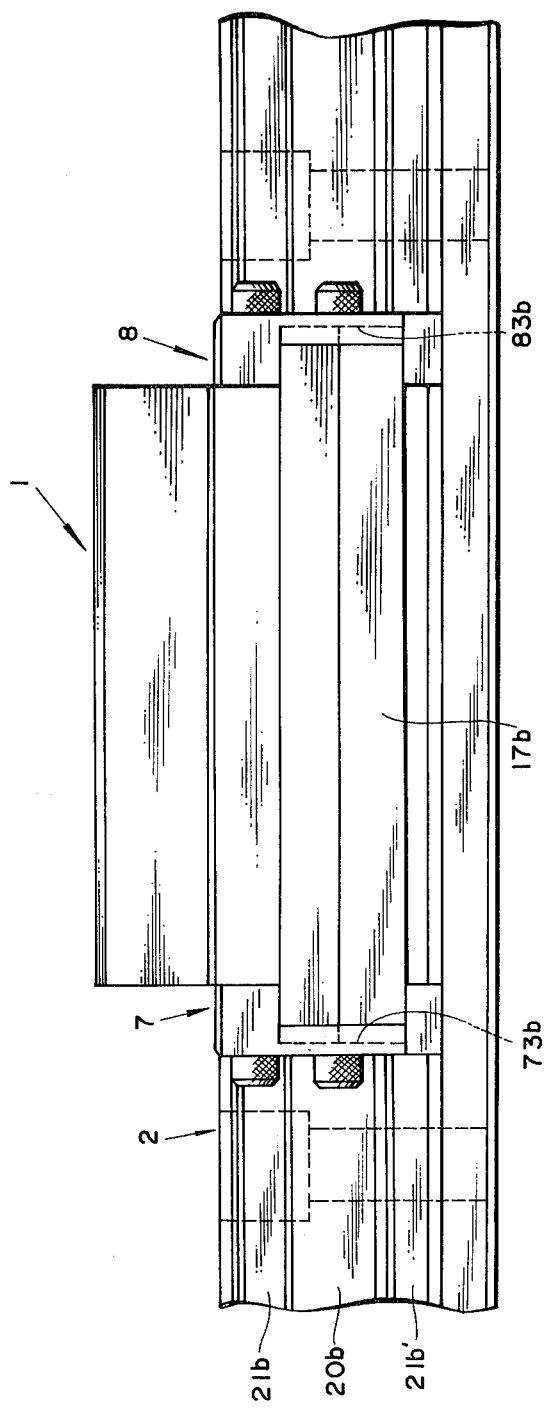
Figure 13:
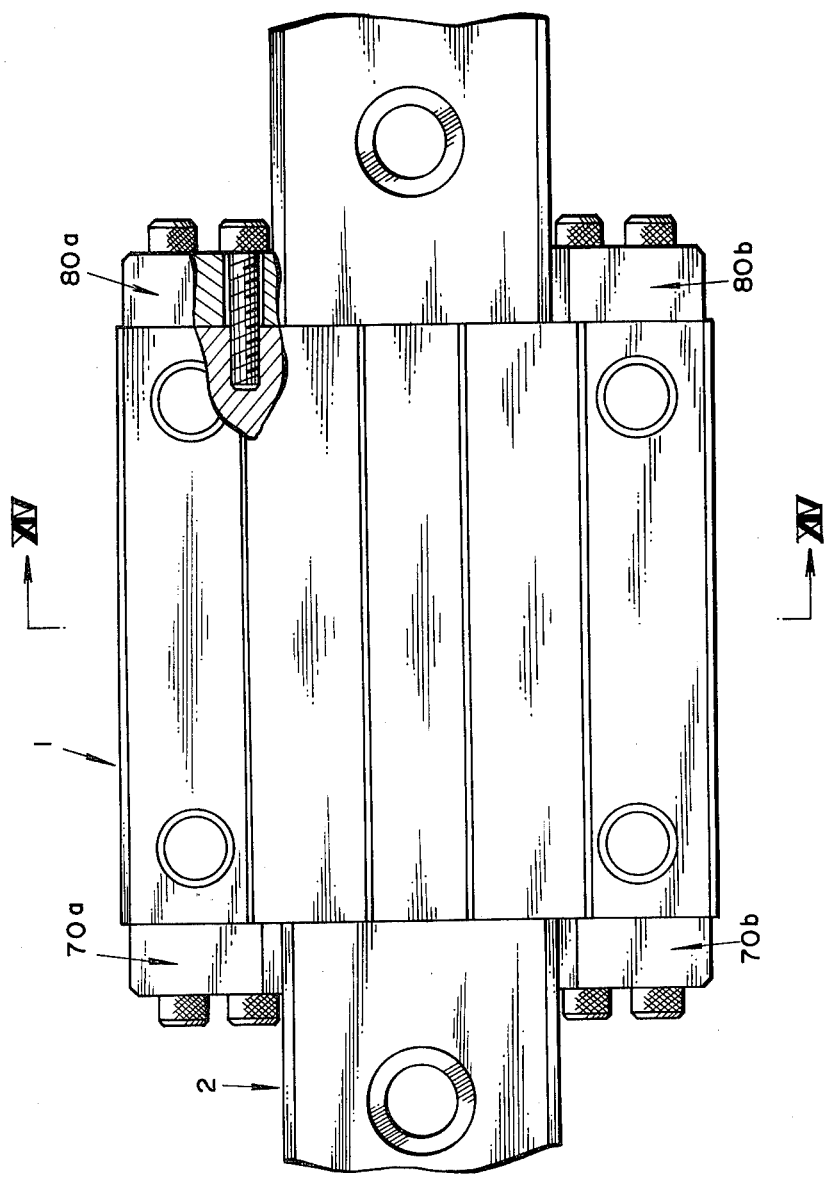

The segment 70b is provided in its inner surface also with a retainer groove 73b for retaining and fixing the channel member 17b and extending across the outer ends of the U-shaped ball turn grooves 71b, 71b'. Similar retainer grooves for fixing and retaining the channel members are formed also in the other segment 70a of the front lid and in the pair of segments 80a and 80b of the rear lid. As will be seen from FIG. 12, the channel members 17a and 17b can be fixed to the front and rear lids 7 and 8 simply by making the ends of the channel members 17a and 17b engage with the retainer grooves 73a, 73b and 83a, 83b in the lids 7 and 8.

Figure 9:
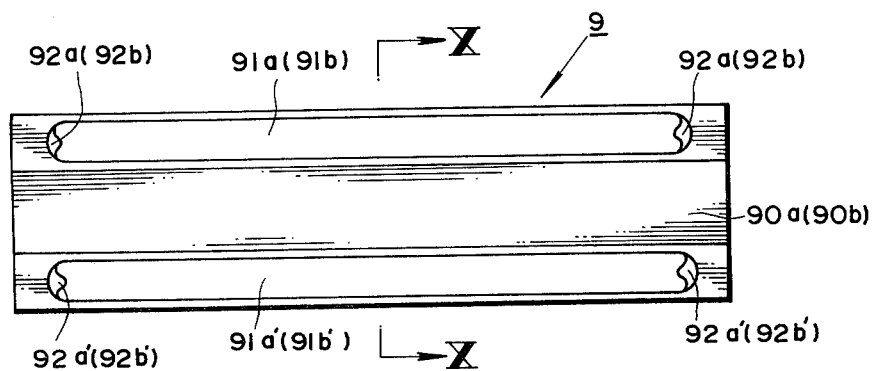
Figure 10:
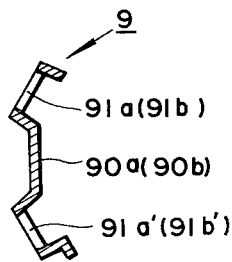
Figure 11:
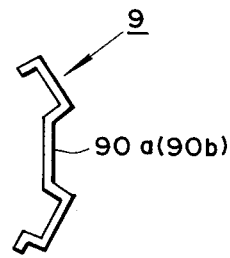
Figure 15:
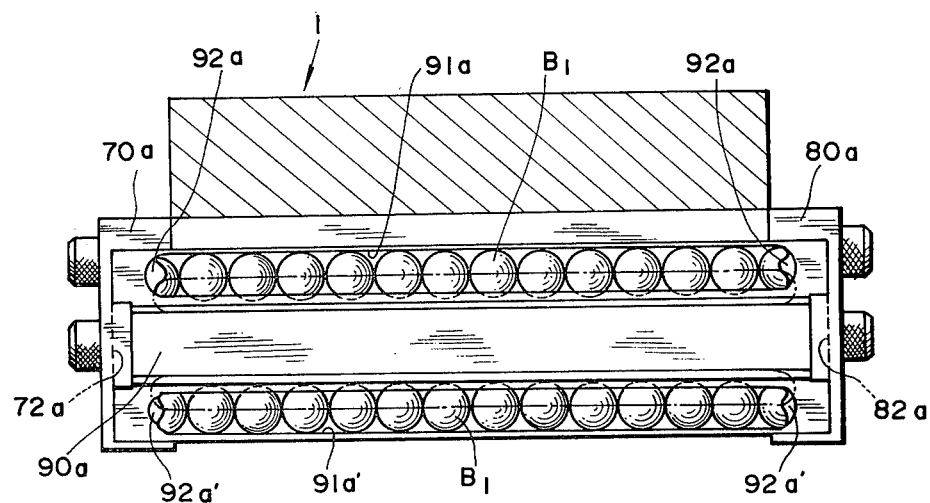
Figure 16:
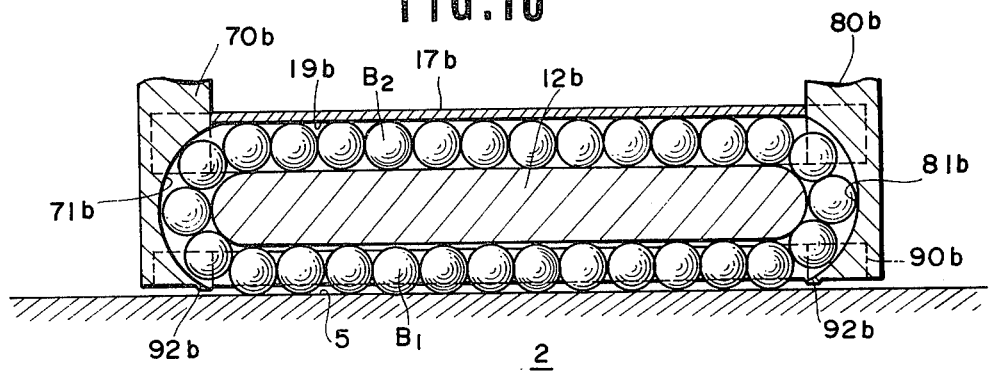

Referring now to FIGS. 9 to 11, a reference numeral 9 denotes an elongated retainer for retaining and guiding loaded balls $B_1$. The retainer 9 consists of a left segment 90a and a right segment 90b arranged in a pair. Slits 91a, 91a', 91b and 91b' are formed in the segments 90a and 90b so as to extend along both side edges of these segments 90a and 90b. The slits 91a, 91a', 91b and 91b are sized to retain the balls B. Tongues 92a, 92a', 92b and 92b', formed in both ends of these slits, are intended for scooping the balls coming out of the loaded ball passageways 3 to 6 and delivering the same into corresponding U-shaped ball turn grooves 71a, 71a', 71b, 71b' and 81a, 81a', 81b, 81b', thereby to ensure smooth turning of the ball running direction from the linear passageways to the semi-circular turn grooves. As will be seen from FIGS. 15 and 16, the pair of retainers 9 are fixed to the lids 7 and 8 with their both ends engaged by the retainer grooves 72a, 72b, 82a and 82b in the lids 7 and 8.

The arrangement is such that, in the assembled state in which the retainers 9 are fitted in the bearing body 1 and fixed at both ends by the lids 7 and 8, the axes of the slits 91a, 91a', 91b and 91b' coincide with the axes of the loaded ball passageways 3 to 6, respectively.

The operation of the linear ball bearing unit of the invention will be described hereinunder with reference to FIGS. 12 to 16 which in combination show the bearing unit in the assembled state. A machine part such as a robot arm (not shown) is mounted on the bearing body 1. As the bearing body 1 is moved forwardly, the loaded balls $B_1$ are made to run rearwardly while being clamped between the ball rolling grooves 14a, 14a', 14b and 14b' in the bearing body 1 and the ball rolling grooves 21a, 21a', 21b and 21b' in the track shaft 2 and guided by the retainer 9. The loaded balls $B_1$ then come out of respective loaded ball passageways 3 to 6 and are scooped by the tongues 92a, 92a', 92b and 92b' on one end of the retainer 9. The tongues then deliver the balls into the U-shaped ball turn grooves 81a, 81a', 81b and 81b' in the lid 8 so that the ball running direction is turned from the linear direction to the circular direction. The balls are then introduced into the non-loaded ball passageways 19a, 19a', 19b and 19b' in the bearing body 1 to run forwardly along these passageways as the non-loaded balls $B_2$. The non-loaded balls coming out of the non-loaded ball passageways 19a, 19a', 19b and 19b' are turned as they move along the U-shaped ball turn grooves 71a, 71a', 71b and 71b' formed in the front lid 7 and then introduced into the loaded ball passageways 3 to 6 to run along the latter as loaded balls $B_1$. This recirculation of ball trains is continued during the forward movement of the bearing body 1. Obviously, the ball trains are recirculated in the reverse direction when the bearing body 1 is moved backwardly.

The linear ball bearing unit of the invention having the construction heretofore described offers the following advantages.

It is to be noted that the production cost of the linear ball bearing unit can be lowered remarkably, because the passageways for the non-loaded balls can be formed by cutting which is easier to conduct and capable of providing higher precision than the boring or drilling which has been necessitated in the production of the known linear ball bearing unit.

Figure 14:
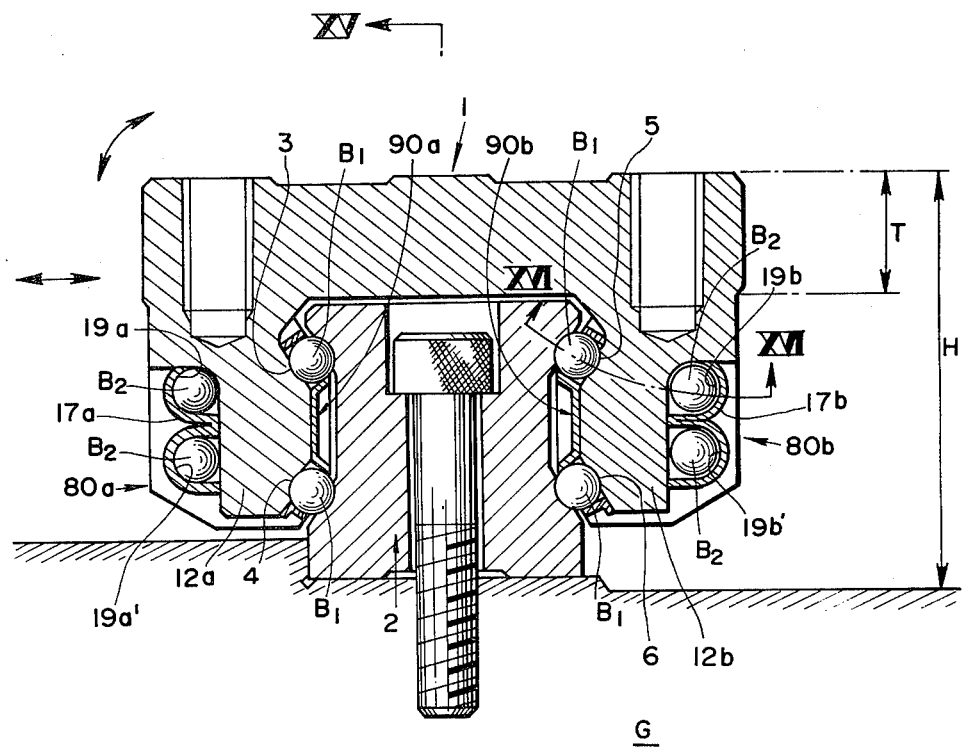

In addition, since two loaded ball passageways are formed at each side of the track shaft as shown in FIG. 14, the linear ball bearing unit can bear heavy load applied in the horizontal or radial directions as indicated by arrows.

It is to be noted also that the height or level H of the top surface of the bearing body 1 from the plane G on which the track shaft is fixed can be reduced because the loaded ball passageways and non-loaded ball passageways are all disposed at lateral sides of the track shaft but not on or above the latter. The reduced level H lowers the position of load application point, i.e. the position of the top surface of the bearing body, which in turn contributes to the enhancement of stability of the linear ball bearing unit. The elimination of the loaded ball passageways from the upper side of the track shaft, i.e. the positioning of the loaded ball passageways on lateral sides of the track shaft allows the bearing unit to bear the load at lateral sides of the track shaft, i.e. at levels comparatively close to the plane G to which the track shaft is fixed, in contrast to the conventional linear slide bearing in which the load acts at a level considerably spaced upward from the plane G. This of course makes it possible to reduce the height of the track shaft itself to further enhance the stability of the linear ball bearing unit advantageously.

In addition, the rigidity of the bearing body 1 is increased because the thickness T of the solid upper part of the bearing body 1 can be increased thanks to the elimination of the loaded ball passageways and non-loaded ball passageways from the upper side of the track shaft. The increased rigidity of the bearing body obviates undesirable outward deformation or opening of the skirts which is often experienced with the known linear ball bearing unit having insufficient rigidity of the bearing body when a heavy load is applied to the upper side of the bearing body and, accordingly, ensures safe and smooth rolling and running of the balls and bearing body.

Although the invention has been described through specific terms, the described embodiment is not exclusive and various changes and modifications may be imparted thereto without departing from the scope of the invention which is limited solely by the appended claims.

What is claimed is:

1. A linear ball bearing unit comprising:
    a bearing body having a pair of skirts provided on their opposing surfaces with longitudinal ribs, said bearing body further having ball rolling grooves formed in both side surfaces of said ribs and constituting parts of passageways for loaded balls, longitudinal recesses formed in the outer surfaces of said skirts, and channel members fitted in respective recesses, said recesses and channel members in combination constituting passageways for non-loaded balls;
    a track shaft provided in both side surfaces thereof with recesses for receiving said ribs on said bearing body, said recesses being provided in both side walls thereof with ball rolling grooves constituting parts of said passageways for loaded balls; and
    lids attached to both ends of said bearing body and adapted to provide ball turn grooves through which said passageways for loaded balls are connected to corresponding passageways for non-loaded balls thereby to permit ball trains to be recirculated through said passageways for loaded ball and then through said passageways for said non-loaded balls.

2. A linear ball bearing unit according to claim 1, characterized by further comprising retainers disposed between said bearing body and said track shaft and provided with slits for retaining and guiding loaded balls running along said passageways for loaded balls.

3. A linear ball bearing unit according to claim 2, wherein the angle of contact between the loaded ball and the surfaces of said passageways for loaded ball constituted by the ball rolling grooves in said bearing body and said track shaft is substantially 45°.

4. A linear ball bearing unit according to claim 3, wherein said ball rolling grooves in said bearing body and said track shaft for constituting said passageways for loaded balls are constituted by circular arc grooves having a radius of curvature which is about a half of the ball diameter.

5. A linear ball bearing unit according to claim 4, wherein tongues are formed in both ends of said slits in each of said retainers.

6. A linear ball bearing unit according to claim 2, wherein said ball rolling grooves in said bearing body and said track shaft for constituting said passageways for loaded balls are constituted by circular arc grooves having a radius of curvature which is about a half of the ball diameter.

7. A linear ball bearing unit according to claim 6, wherein tongues are formed in both ends of said slits in each of said retainers.

* * * * *